Figure 4:
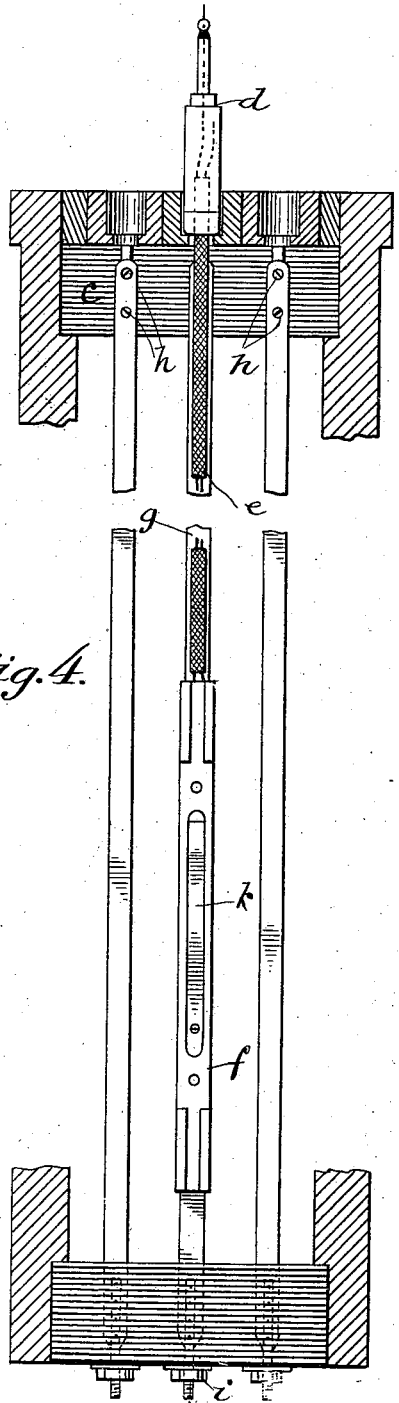

(No Model.) 4 Sheets—Sheet 1.
C. E. SCRIBNER & E. P. WARNER.
TELEPHONE EXCHANGE SWITCHBOARD.
No. 563,327. Patented July 7, 1896.
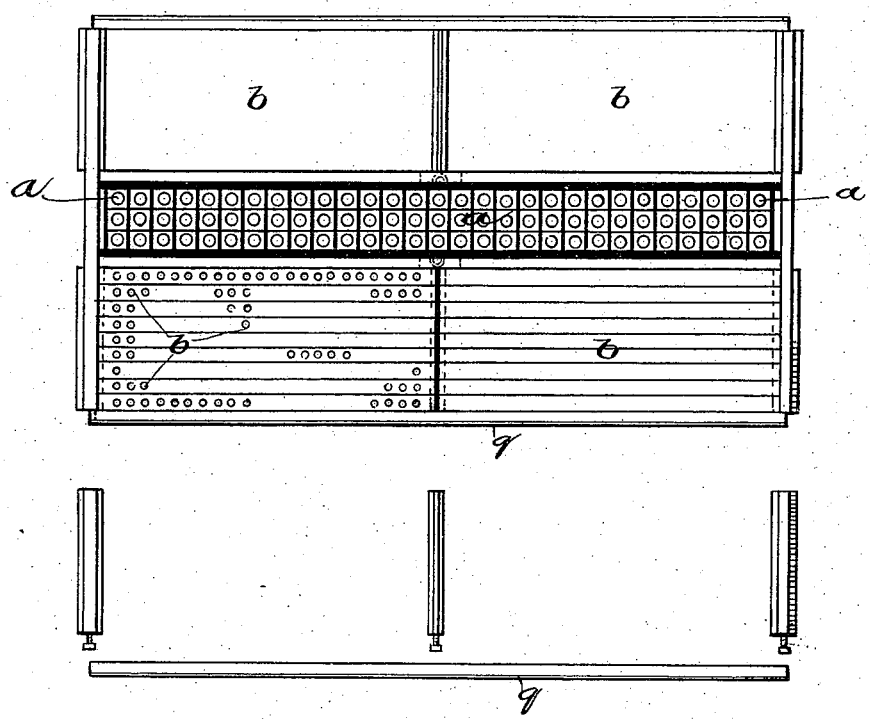
Fig. 1.
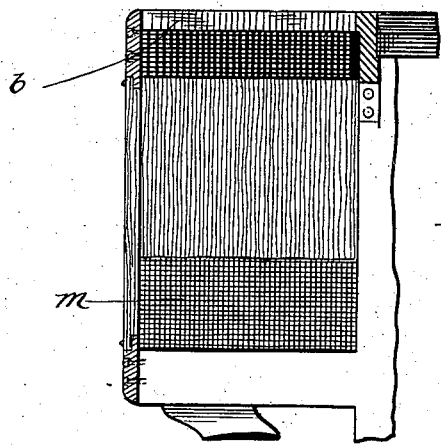
Fig. 1.a.
Witnesses.
Charles G. Hawley.
Geo. R. Parker.
Inventors.
Charles E. Scribner
Ernest P. Warner.
George P. Barton
Attorney.

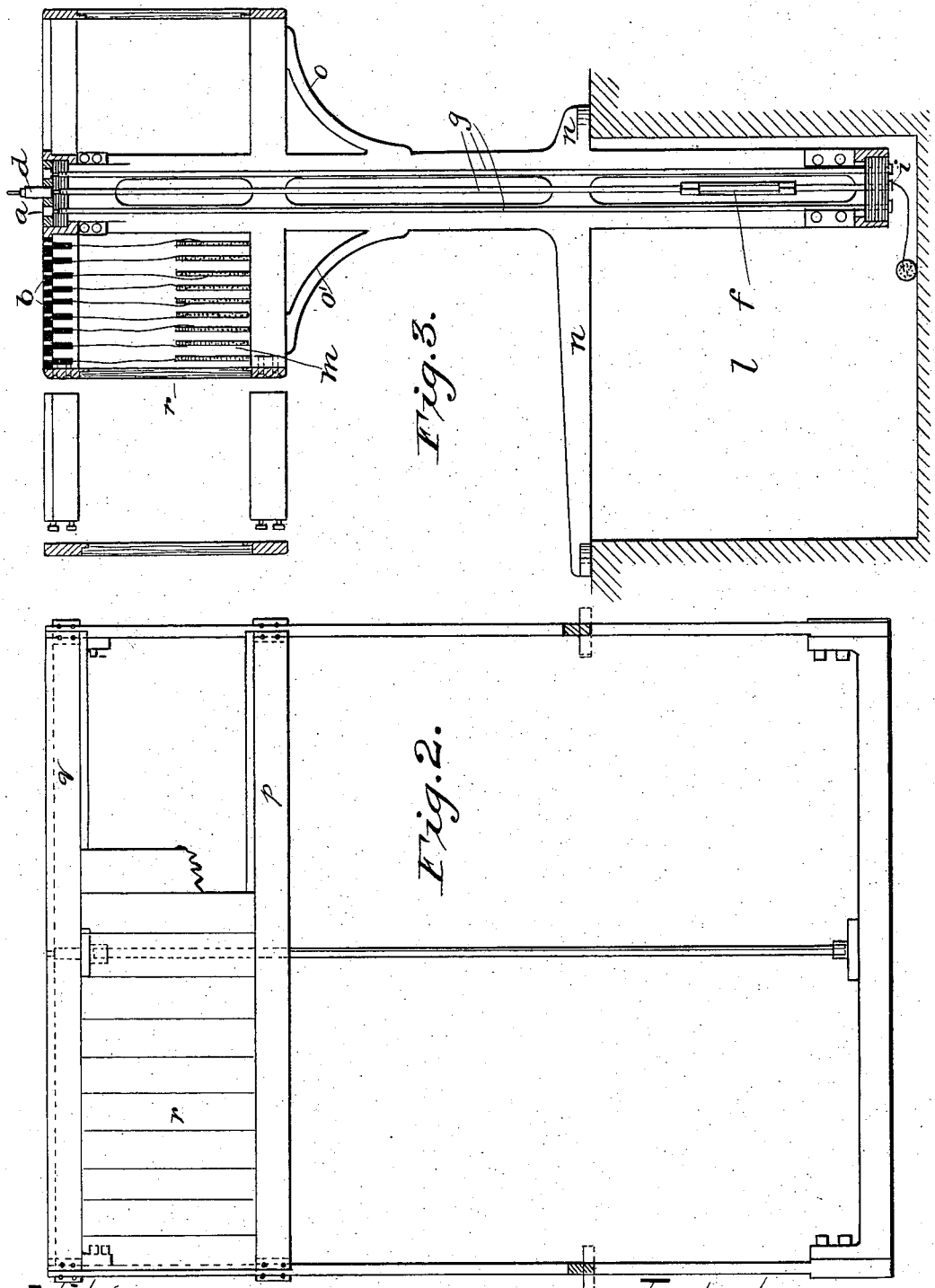

(No Model.) 4 Sheets—Sheet 3.

C. E. SCRIBNER & E. P. WARNER.
TELEPHONE EXCHANGE SWITCHBOARD.

No. 563,327. Patented July 7, 1896.

Witnesses.
Charles G. Hawley.
Geo. R. Parker.

Inventors.
Charles E. Scribner.
Ernest P. Warner.
By George H. Barton
Attorney.

(No Model.) 4 Sheets—Sheet 4.

C. E. SCRIBNER & E. P. WARNER.
TELEPHONE EXCHANGE SWITCHBOARD.

No. 563,327. Patented July 7, 1896.

Witnesses.
Charles G. Hawley.
Ella Edler.

Inventors.
Charles E. Scribner.
Ernest P. Warner.
By George P. Barton
Attorney.

THE NORRIS PETERS CO., PHOTO-LITHO., WASHINGTON, D. C.

UNITED STATES PATENT OFFICE.

CHARLES E. SCRIBNER AND ERNEST P. WARNER, OF CHICAGO, ILLINOIS, ASSIGNORS TO THE WESTERN ELECTRIC COMPANY, OF SAME PLACE.

TELEPHONE-EXCHANGE SWITCHBOARD.

SPECIFICATION forming part of Letters Patent No. 563,327, dated July 7, 1896.

Application filed February 7, 1890. Serial No. 339,599. (No model.)

*To all whom it may concern:*

Be it known that we, CHARLES E. SCRIBNER and ERNEST P. WARNER, citizens of the United States, residing at Chicago, in the county of Cook and State of Illinois, have invented a certain new and useful Improvement in Telephone-Exchange Switchboards, of which the following is a full, clear, concise, and exact description, reference being had to the accompanying drawings, forming a part of this specification.

Our invention relates to the construction of multiple switchboards for telephone-exchanges of the table or horizontal type, and its objects are, speaking generally, first, to provide reliable sliding or frictional contacts between the different strands of the different cords and their connections with the lines; second, to provide room underneath the spring-jack switches for running the tapes or bands carrying the wires; third, to provide a trough or conduit under the switchboard and mounting the switchboard thereon in such manner that the mass of cables may be run below the level of the floor, and, fourth, to provide a removable block or socket for each cord and plug, whereby any cord and its weight may be readily removed for inspection or repairs.

Heretofore multiple switchboards of various constructions have been used in telephone-exchanges, the more common form consisting of a board placed vertically and divided into duplicate sections, the whole board being usually spoken of as a "multiple" switchboard and the different duplicate parts as "sections" of the multiple board. Sometimes the different parts are referred to as different switchboards, because in the early days it was common to construct the sections separately. Another form of switchboard is known as the "table" switchboard, such a form having been used to a considerable extent.

Our invention relates more especially to this latter type. It will appear, however, from the succeeding description that certain features thereof might be applied to the vertical type of switchboards.

Our invention consists, first, in a double-stranded flexible conducting-cord provided with a plug having a different terminal for each strand, in combination with a weight having two insulated parts, one connected with each of said strands, and guides of conducting material insulated from one another, against which the different portions of the weight are adapted to press and maintain electrical connection as the plug, cord, and weight are raised and lowered.

Our invention consists, second, in a table provided with sockets for supporting the plugs in line along the longitudinal center of the table, said table being provided on the different sides of said plugs with spring-jack switches for the telephone-lines and said plugs being provided with flexible cords held taut by weights and adapted to maintain electrical connection between the different strands of said cords and the telephone-lines with which said strands may be connected, so that the terminals of the plug may form the terminal connections of a metallic circuit.

Our invention consists, third, in the manner of supporting said sockets upon the table so as to permit of the independent removal of any one of said sockets.

Our invention consists, fourth, in the iron frame having arms adapted to rest upon the floor to form the main base or support thereof above the conduit containing the mass of cables, the upper portion of said frame being provided with brackets preferably cast thereon and serving as supports for the framework of the table.

Our invention consists, fifth, in extending the transverse supporting-frames below the floor, in combination with the strips of insulating material and the vertical metallic bands or guides for the weights; and Our invention consists, sixth, in the manner of holding the panels or castings of the tables in place by the iron strips or bands which are secured upon the frames extending from one to the other.

Our invention is illustrated in the accompanying drawings, in which—

Figure 5:
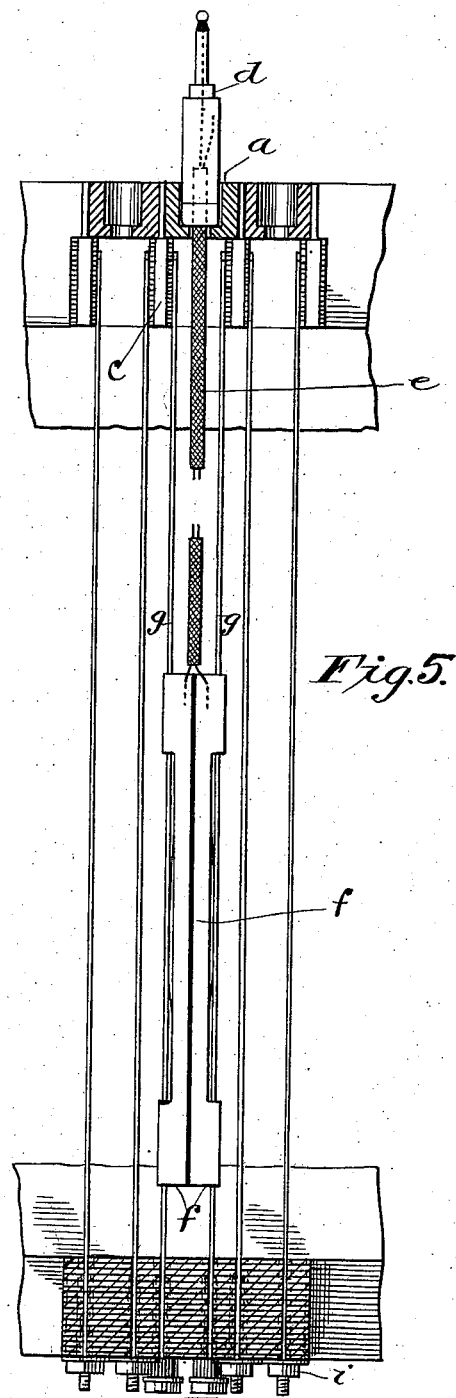
Figure 6:
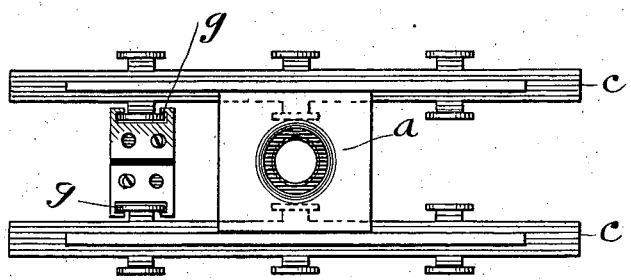
Figure 7:
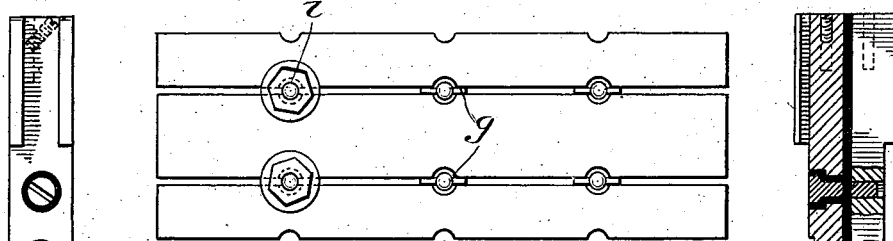
Figure 8:
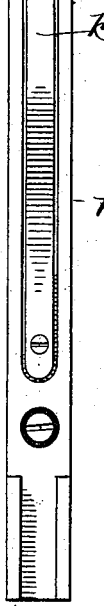
Figure 9:
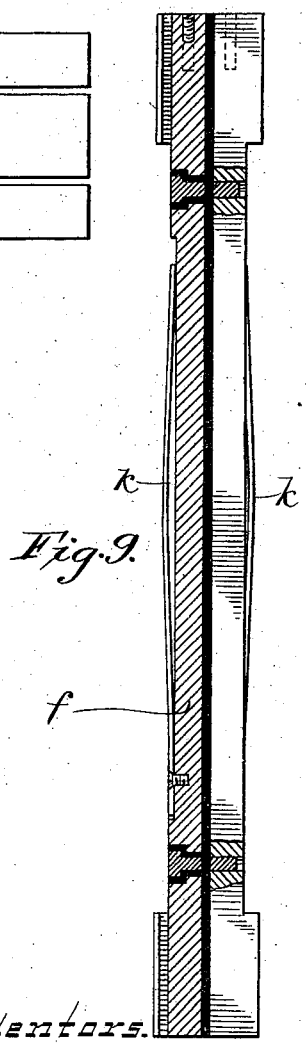

Figure 1 is a plan view of one table or section of a multiple switchboard. Fig. 1ª shows the flat cables and the strips of spring-jacks in section, together with the connecting-wires. Fig. 2 is an elevation of one of the sides thereof. Fig. 3 is a vertical transverse section thereof upon line X of Fig. 1. Fig. 4 is a detailed transverse sectional view showing the construction of the plug-sockets and the manner of attaching the metallic strips forming the guides at their upper and lower ends, together with the position of one plug with its cord and weight to the guides thereof and the socket of the plug. Fig. 5 is a longitudinal vertical sectional view also illustrative of the sockets, the metallic strips forming the guides, and their connections. Fig. 6 is a plan view of two of the transverse bars of insulating material, with a central socket supported centrally thereon, one of the weights being shown in proper position in relation thereto and to the guides. Fig. 7 is a view from below, showing transverse notched bars of insulating material, which form supports for the lower ends of the metallic guides. Fig. 8 is a full-sized side view of one of the weights. Fig. 9 is a view of the weight, one side thereof being in section to show the manner of mechanically joining the two halves together and maintaining the one insulated from the other.

Like parts are indicated by similar letters of reference throughout the different figures.

As shown in Fig. 1, the plug-sockets $a$ are placed in rows longitudinally across the center of the table. The spring-jack switches $b$ are placed outside of these sockets on different sides thereof, so that the operators sitting on different sides of the table will reach over the spring-jack switches immediately in front of her to get at the plugs. We have omitted in Fig. 1 the plugs and have indicated only a portion of the spring-jack switches. It will be understood that each operator is connected by a circuit independent of the telephone-lines with a group of subscribers in such manner that any subscriber may speak directly to the particular operator of his group, and, the order being given, the operator completes the connection between the subscriber calling and the subscriber called for.

We do not deem it necessary to illustrate or describe the means whereby the subscribers and operators communicate with one another, since our invention does not relate specially to any particular system of giving and receiving the calls between the subscribers and operators.

We have mentioned above simply the well-known system of listening-operators as one of the simplest. We do not, however, confine our invention to any particular system of signaling between the subscribers and operators, since individual annunciators may be used in the well-known way if desired.

Each table will contain, according to the multiple-switchboard system, a spring-jack switch for each telephone-line, so that any two lines may be connected upon either of the tables, the different tables being duplicates of one another, except that ordinarily in single-cord systems the terminal plugs of the different lines will be distributed among the tables in the well-known way; that is to say, the operators at the different tables will be provided each with means for receiving calls from only a particular group of subscribers, so that the call of any given subscriber will be received always at a particular board, the operator receiving the call having, as is usual, means for connecting the line of the calling subscriber with the line of the subscriber wanted at her particular table.

Any well-known test system may be used to prevent an operator from making connection with a line which is already busy.

The plug-socket $a$, as shown in Fig. 6, is supported between the transverse bars $c\ c$, which are preferably of rubber or like insulating substance.

As shown in Fig. 5, a plug $d$, having a double-stranded cord $e$, rests in each socket. The different strands of the cord are connected with the different halves of the weight $f$. The guides $g\ g$ of conducting material are maintained in contact with the different sides of the weight respectively, the weight moving up and down upon said guides as the plug $d$ is lifted from its socket or returned thereto. Each pair of guides $g\ g$ may be connected with a different strand or limb of the same metallic circuit, these guides $g\ g$ being secured in position as shown most clearly in Figs. 4, 5, 6, and 7; that is to say, they are secured to the transverse rubber bars $c\ c$ at the top by screws $h$ and at the bottom by nuts and washers $i$, so that they may be drawn taut. The springs $k\ k$ upon the different sides of the sliding weights serve to maintain good connections between the guides $g\ g$ and the different portions of the weight as the weights are raised and lowered.

The tables may be placed end to end and the cables carrying the wires may be run under the floor in a duct $l$, as shown most clearly in Fig. 3. The wires may be distributed among the different spring-jack switches from bands $m$, placed under the spring-jack switches in suitable openings provided therefor, as also shown in Fig. 3.

The bracket or frame of the table is preferably a casting which extends below the floor of the operating-room. This frame has a base or support $n$ extending across the duct containing the cables, and is provided with brackets $o$ for supporting the table proper. Two such castings are provided for each table. When the tables are placed in line end to end, a casting will come between the different tables, so that contiguous ends of two tables may be supported upon the same casting.

Fig. 1$^a$ shows the arrangement of the webs or cables which connect together the different sockets of the system. These webs or bands $m$ are laid up on edge upon the bracket or arm of the frame, as shown, and are firmly pressed between the upright portion of the frame and the panel $r$. To remove any one of the strips of sockets it is simply necessary to loosen the screws at the ends of the strips or rails *p q* and open up the mass of cables, which will permit of the raising out from the mass any individual cable or band *m* to permit of the inspection of the sockets and cable connections to the sockets.

The bracket *o* sustains the weight of the mass of webs or bands *m*, the connecting-wires between the web and sockets being given sufficient slack to insure the weight of the webs being sustained by the bracket.

In Fig. 3, for greater clearness, only a portion of the bands *m* are shown.

In the lower portion of Fig. 1 the rail *q* is shown detached from the stiles.

Our invention admits of various modifications which would readily suggest themselves to those skilled in the art, and therefore in certain of the claims we have not limited ourselves to the precise details of construction hereinbefore illustrated and described.

Having thus described our invention, we claim as new and desire to secure by Letters Patent—

1. A switchboard-table provided with separately-removable plug-sockets arranged along the longitudinal center of the board and the spring-jack switches placed on opposite sides of said sockets, substantially as shown and described.

2. The combination with the removable socket, of a plug adapted to rest therein, said plug being provided with a double-stranded cord, a weight having two insulated portions connected with said strands respectively and guides of conducting material between which the weight is placed and adapted to be raised and lowered in frictional electrical connection as the plug is lifted from its socket and returned thereto.

3. The table-switchboard provided with removable plug-sockets *a*, said plug-sockets being supported between transverse bars *c c*, in combination with the pairs of guides one pair under each socket and connecting-plugs provided with weights, said weights coming each between a different pair of said guides and adapted to maintain frictional electrical connection therewith as the plug is lifted and returned to its socket, substantially as and for the purpose specified.

4. The iron frames between the different tables or duplicate parts of the switchboard extending downward below the floor-line, in combination with means supported upon the lower portions of said frames for holding the lower ends of the metallic guides and maintaining the same insulated from one another, substantially as and for the purpose specified.

5. The horizontally-placed strips of switches and bands or webs supported under the same, each strip having connections with a different web or band, whereby any strip may be raised and with it the web or band under the same with which it is connected, substantially as and for the purpose specified.

6. The webs or bands of cables *m* supported upon the bracket and corresponding strips *b* of spring-jack switches separately connected therewith and a removable panel *r*, substantially as and for the purpose specified.

In witness whereof we hereunto subscribe our names this 1st day of February, A. D. 1890.

CHARLES E. SCRIBNER.
ERNEST P. WARNER.

Witnesses:
ELLA EDLER,
GEORGE P. BARTON.